W. N. BEST.
SAFETY SIGNAL FOR VEHICLES.
APPLICATION FILED SEPT. 9, 1915.
1,192,264.
Patented July 25, 1916.
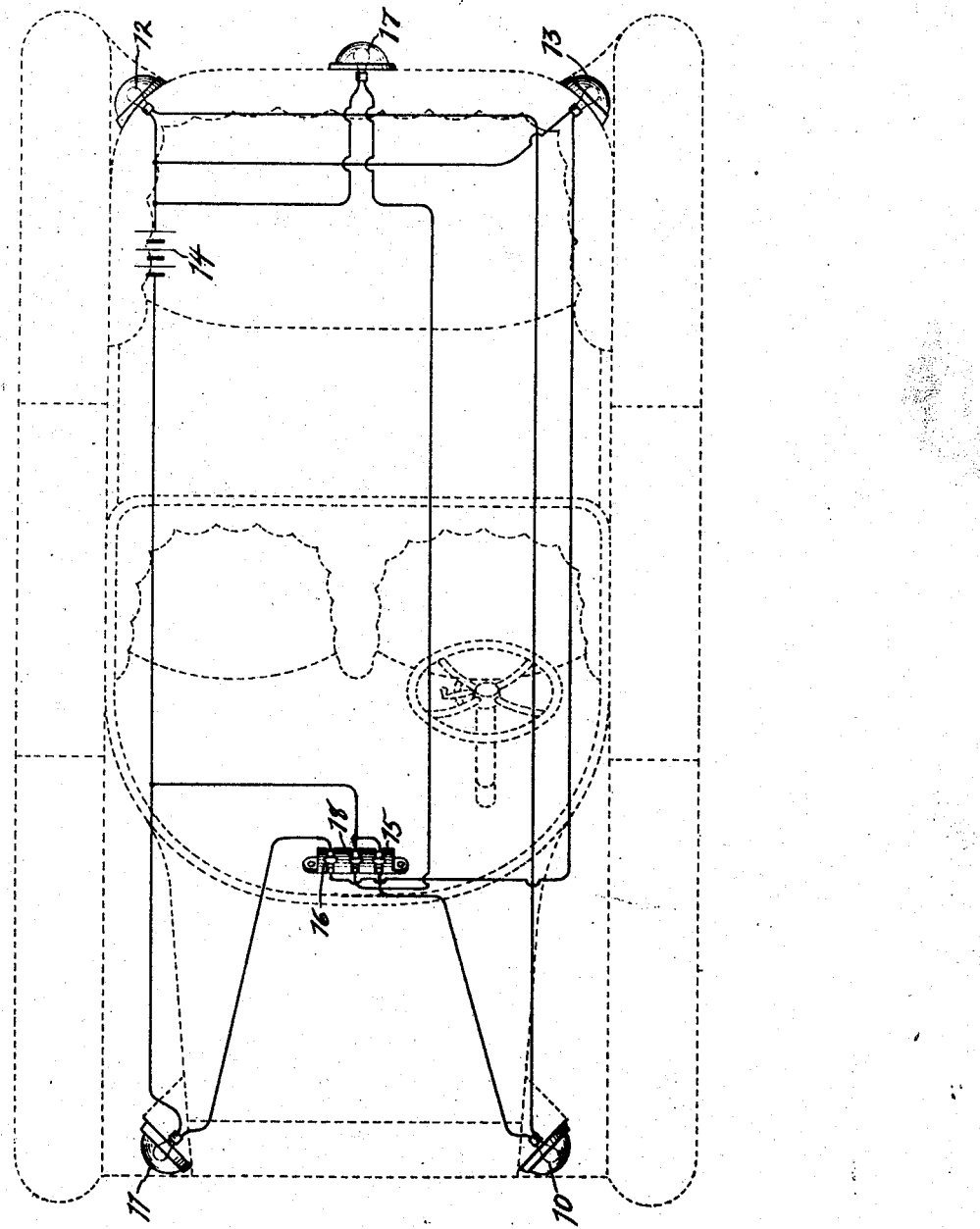
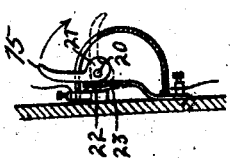

UNITED STATES PATENT OFFICE.

WILLIAM N. BEST, OF NEW YORK, N. Y., ASSIGNOR OF ONE-FOURTH TO CECILIA WUPPER, OF BROOKLYN, NEW YORK.

SAFETY-SIGNAL FOR VEHICLES.

1,192,264.  Specification of Letters Patent.  Patented July 25, 1916.

Application filed September 9, 1915. Serial No. 49,773.

*To all whom it may concern:*

Be it known that I, WILLIAM N. BEST, a citizen of the United States, and a resident of the city of New York, borough of Brooklyn, county of Kings, and State of New York, have invented certain new and useful Improvements in Safety-Signals for Vehicles, of which the following is a specification.

This invention relates to certain improvements in safety signal devices for automobiles or other vehicles.

The main object of my invention is to provide durable, inexpensive, and easily and positively operated means whereby an occupant of the vehicle may warn those behind, ahead, and at one side, of his intention to turn or stop.

The signaling devices themselves may vary in character but are preferably some form of illuminating means whereby the signals may be readily seen at night. The illumination may be produced by electricity or by the burning of liquid or gaseous fuel, such as oil or acetylene. The signals may be provided with shields so that they are normally invisible and only become visible upon the operation of the controlling means, or if they are in the form of electric lights such shield or guard may be omitted and the current turned on or off by the controlling means.

As an important feature of my invention, I arrange the slides at the four corners of the vehicle and connect those at diagonally opposite corners for simultaneous operation. Thus, if the driver desires to turn toward the left, he may simultaneously turn on or render visible the light at the front left hand corner and at the rear right hand corner. The lights are so designed that they direct their rays both in the direction of travel of the vehicle and laterally so that a person on a side street, for instance, may see the front, laterally directed light of the vehicle if the driver desires to turn in that direction on to the side street. Likewise, those behind the vehicle, upon seeing the light at the rear right-hand corner, will know that the vehicle is to turn toward the left. A separate signaling light may be employed at the rear for indicating that the car is to go slower or to stop.

Reference is to be had to the accompanying drawings in which I have illustrated rather diagrammatically one embodiment of my invention. I wish it specifically understood that I am not limited to such details as are shown inasmuch as various other forms may be constructed in accordance with my invention without departing from the scope of the appended claim.

In these drawings, Figure 1 is a plan view of a vehicle showing the arrangement of lights and the wiring diagram, and Fig. 2 is a transverse section through the controlling switch.

In carrying out my invention, I provide lights 10, 11, 12 and 13 at the four corners of the vehicle, the two lights 10 and 11 being at the front corners and arranged to throw their rays forwardly or laterally. If desired, they may be so constructed as to direct their rays only laterally and not forwardly, but the other arrangement is preferable as it serves to warn approaching vehicles of the intention to turn. The lights 12 and 13 are at the rear corners and direct their rays not only rearwardly but laterally. The lights 10 and 12 which are at diagonally opposite corners of the vehicle, may be connected in the same circuit or may be operated by the same controlling member. As shown, they are arranged in series with the battery 14 or other source of electrical energy, and a controlling switch 15. The lights 11 and 13 at diagonally opposite corners are connected in series in another circuit including the source of electrical energy and a controlling member 16. In addition to these lights, I preferably provide another light 17 which is mounted in the center of the rear of the vehicle and connected to the battery and a controlling member 18. The three controlling members 15, 16 and 18 are arranged closely adjacent each other and either on the steering post, the dashboard, or at any other convenient point. Preferably, the switches 15 and 16 are positioned upon opposite sides of the switch 18 and each toward the same side of the vehicle as the front lamp which it controls. Thus, if the driver desires to turn toward the left, he moves the left-hand switch, while if he desires to turn toward the right, he moves the right-hand switch. When the driver desires to slow down or stop, he operates the center switch to turn on the rear center light 17.

The lights may be of any desired color

BEST AVAILABLE COPY although they are preferably of a color clearly distinguishable from the ordinary white lights, and the ordinary red tail light. I find that green is a very satisfactory color for all of the lights embodying my invention.

The switches or controlling means may be of various different forms but are preferably such that when any switch is closed it will remain closed until again operated. By this I mean that any form of switch may be employed other than the ordinary form of push-button which breaks the circuit the instant it is released.

I have shown the switches 15, 16 and 18 in the form of levers mounted to swing in parallel vertical planes about a common axis 20 and each having a cam portion 21 for pressing together two leaves or terminals 22 and 23. The levers normally extend upwardly or may be swung down whenever desired, and will remain in lowered position with the circuit closed until again positively raised.

The signaling system which I have described is preferably separated from the ordinary search lights, tail light and side lights employed on most automobiles. I have not illustrated the ordinary lights as they form no portion of my present invention. The lights may be operated from the same source of energy as the usual lights on a car, or may constitute an entirely independent system.

Having thus described my invention, what I claim as new and desire to secure by Letters Patent is:

The combination with a vehicle, of a plurality of electric lights, one arranged at each corner of the vehicle body and each directing its rays both laterally and in the direction of travel of the vehicle, an electric circuit including the lights at two diagonally opposite corners, a second circuit including the lights at the other two diagonally opposite corners, and separate circuit controllers for said circuits and designed to remain indefinitely in their open or closed position after manual operation.

Signed at New York in the county of New York, and State of New York this eighth day of September, A. D. 1915.

WILLIAM N. BEST.